United States Patent
Hattori (10) Patent No.: US 10,284,898 B2
(45) Date of Patent: May 7, 2019

(54) DATA DISTRIBUTION DEVICE AND IMAGING APPARATUS

(71) Applicant: Panasonic Intellectual Property Management Co., Ltd., Osaka (JP)

(72) Inventor: Atsushi Hattori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/492,377

(22) Filed: Apr. 20, 2017

(65) Prior Publication Data

US 2017/0223403 A1 Aug. 3, 2017

Related U.S. Application Data

(63) Continuation of application No. 14/608,088, filed on Jan. 28, 2015, now Pat. No. 9,667,443.

(30) Foreign Application Priority Data

Mar. 20, 2014 (JP) .................................. 2014-057475
Dec. 4, 2014 (JP) .................................. 2014-245493

(51) Int. Cl.
*H04W 4/00* (2018.01)
*H04N 21/4223* (2011.01)
(Continued)

(52) U.S. Cl.
CPC ......... *H04N 21/4223* (2013.01); *H04L 45/00* (2013.01); *H04L 45/42* (2013.01);
(Continued)

(58) Field of Classification Search
CPC ............. H04N 21/4223; H04N 21/631; H04N 21/6175; H04N 21/6125; H04L 45/42; H04L 65/4076; H04L 21/2743
See application file for complete search history.

(56) References Cited

U.S. PATENT DOCUMENTS 6,725,303 B1 * 4/2004 Hoguta ................ H04Q 3/0016
709/227
8,483,155 B1 * 7/2013 Banerjea ............... H04W 16/14
370/329
(Continued)

FOREIGN PATENT DOCUMENTS

| JP | 2006-033396 A | 2/2006 |
| JP | 2006-067105 A | 3/2006 |
| JP | 2012-015725 A | 1/2012 |

OTHER PUBLICATIONS

Non-final U.S. Office Action dated Mar. 31, 2016 issued in U.S. Appl. No. 14/608,088.

(Continued)

*Primary Examiner* — Jay P Patel
(74) *Attorney, Agent, or Firm* — McDermott Will & Emery LLP (57) ABSTRACT

A data distribution device for stably distributing specific data such as video data is provided. Video distribution device as a data distribution device includes video distribution unit as a specific data distribution unit, video distribution determining unit as a specific data distribution determining unit, and routing setting unit. When video distribution determining unit determines that video distribution unit is distributing video data as the specific data, and when the default route information has been acquired from a second communication device connected to a second network, routing setting unit holds the default route information without changing the default route.

6 Claims, 5 Drawing Sheets

(51) Int. Cl.

| | | |
|---|---|---|
| *H04N 21/61* | (2011.01) | |
| *H04N 21/643* | (2011.01) | |
| *H04L 29/08* | (2006.01) | |
| *H04L 29/06* | (2006.01) | |
| *H04L 12/741* | (2013.01) | |
| *H04L 29/12* | (2006.01) | |
| *H04N 21/63* | (2011.01) | |
| *H04L 12/701* | (2013.01) | |
| *H04L 12/717* | (2013.01) | |
| *H04N 21/2743* | (2011.01) | |

(52) U.S. Cl.
CPC ........ *H04L 45/54* (2013.01); *H04L 61/2015* (2013.01); *H04L 65/4069* (2013.01); *H04L 65/4076* (2013.01); *H04L 67/2814* (2013.01); *H04N 21/2743* (2013.01); *H04N 21/6125* (2013.01); *H04N 21/6175* (2013.01); *H04N 21/631* (2013.01); *H04N 21/64322* (2013.01)

(56) References Cited

U.S. PATENT DOCUMENTS

| | | | | |
|---|---|---|---|---|
| 9,930,076 | B2* | 3/2018 | Ellison | H04L 65/1069 |
| 2002/0059619 | A1* | 5/2002 | Lebar | H04N 7/10 |
| | | | | 725/87 |
| 2005/0144645 | A1* | 6/2005 | Casey | G08B 27/005 |
| | | | | 725/95 |
| 2005/0176432 | A1 | 8/2005 | Kamura et al. | |
| 2008/0130627 | A1* | 6/2008 | Chen | H04L 45/02 |
| | | | | 370/351 |
| 2008/0276270 | A1* | 11/2008 | Kotaru | H04N 21/252 |
| | | | | 725/34 |
| 2009/0287837 | A1* | 11/2009 | Felsher | G06F 19/328 |
| | | | | 709/229 |
| 2010/0103837 | A1* | 4/2010 | Jungck | H04L 29/12066 |
| | | | | 370/252 |
| 2010/0260191 | A1* | 10/2010 | Hiie | H04L 12/1827 |
| | | | | 370/400 |
| 2010/0260192 | A1* | 10/2010 | Hiie | H04L 45/00 |
| | | | | 370/400 |
| 2010/0262709 | A1* | 10/2010 | Hiie | H04L 12/1827 |
| | | | | 709/231 |
| 2011/0138064 | A1* | 6/2011 | Rieger | G06F 17/30905 |
| | | | | 709/228 |
| 2011/0194833 | A1* | 8/2011 | Jong | H04N 5/782 |
| | | | | 386/248 |
| 2011/0261947 | A1* | 10/2011 | Benefield | H04L 12/1827 |
| | | | | 379/265.09 |
| 2012/0159337 | A1 | 6/2012 | Travilla et al. | |
| 2013/0335513 | A1* | 12/2013 | Broadworth | H04N 7/15 |
| | | | | 348/14.08 |
| 2013/0336170 | A1* | 12/2013 | Broadworth | H04L 65/403 |
| | | | | 370/260 |
| 2014/0111598 | A1* | 4/2014 | Paxinos | H04N 7/142 |
| | | | | 348/14.04 |
| 2014/0146126 | A1* | 5/2014 | Nicholson | H04L 12/1818 |
| | | | | 348/14.08 |
| 2014/0373124 | A1* | 12/2014 | Rubin | H04L 67/28 |
| | | | | 726/7 |
| 2015/0086174 | A1* | 3/2015 | Abecassis | H04N 21/4126 |
| | | | | 386/201 |
| 2015/0135208 | A1* | 5/2015 | Itagaki | H04N 21/4363 |
| | | | | 725/25 |
| 2015/0350071 | A1 | 12/2015 | Pauly et al. | |
| 2016/0036743 | A1 | 2/2016 | Rosen et al. | |

OTHER PUBLICATIONS

Final U.S. Office Action dated Sep. 7, 2016 issued in U.S. Appl. No. 14/608,088.

U.S. Notice of Allowance dated Jan. 23, 2017 issued in U.S. Appl. No. 14/608,088.

* cited by examiner

DATA DISTRIBUTION DEVICE AND IMAGING APPARATUS

CROSS-REFERENCE TO RELATED APPLICATIONS

This application is a continuation patent application of U.S. patent application Ser. No. 14/608,088 filed on Jan. 28, 2015, now U.S. Pat. No. 9,667,443, which claims priority to Japanese Patent Application Nos. 2014-245493 filed on Dec. 4, 2014 and 2014-057475 filed on Mar. 20, 2014, the disclosures of which are incorporated by reference herein.

BACKGROUND OF THE INVENTION

1. Field of the Invention

The present disclosure relates to a data distribution device and imaging apparatus for distributing specific data such as video data via a network to an external device connected to the network.

2. Background Art

A communication device is known that, when it connects to a network, acquires routing information including default route information using a communication protocol such as a DHCP (Dynamic Host Configuration Protocol) or PPP (Point to Point Protocol), and performs automatic setting. This communication device does not require the network setting by a user.

The routing information means the information indicating a transfer route of an IP (Internet Protocol) packet (which means data in a form capable of being handled on a network, and is referred to also as "packet") on a network. The default route information means the routing information that indicates an IP address (serving as the transfer destination of the IP packet) used when the transmission source does not know the transfer destination of the IP packet. For example, upon acquiring default information, a device as the transmission source of the IP packet sets a default route in accordance with the default route information, and transfers, along the default route, the IP packet whose transfer destination is not known.

A computer terminal (simply referred to also as "terminal") is known that includes a plurality of communication devices including a first communication device and a second communication device and can be connected to a plurality of networks. This terminal can be connected to one network (e.g. first network) using the first communication device, and can be connected to another network (e.g. second network) using the second communication device.

However, this terminal acquires routing information from one network and performs automatic setting, so that the communication via another network is sometimes disabled. For example, the terminal is connected to the first network via the DHCP using the first communication device. In this state, the terminal can perform communication via the first network. Then, the terminal is connected to the second network via the DHCP using the second communication device. In this case, the routing information set when the terminal is connected to the first network is updated to the routing information acquired via the second communication device. Therefore, the terminal transmits all of subsequent data (transmission packets) via the second network.

Thus, when the routing information (default route) is automatically updated, the following problems can occur, for example.

(1) Although the communication state where specific data is transmitted (for example, video distribution by streaming) via a first network (for example, network allowing high-speed communication) is intended to be kept, the default route is changed so that the communication is performed via a second network (for example, a network having a relatively low communication speed). Therefore, a trouble (for example, a temporary halt of streaming) occurs in transmission of the specific data.

(2) This terminal cannot communicate, via a second network, with a terminal as the communication partner with which this terminal has communicated via a first network. Here, the first network is a public line network such as LTE (Long Term Evolution), and the second network is LAN (Local Area Network) that is not connected to the Internet, for example. Therefore, the switching of the default route from the first network to the second network disables the data transmission (e.g. video distribution) to the terminal as the communication partner.

Unexamined Japanese Patent Publication No. 2006-067105 (Patent Literature 1) discloses a method in which the routing information indicating the combination of a preset specific communication partner and a specific communication device is previously registered, and a communication route (routing) is set in accordance with the combination. In this method, even when the routing information is updated upon connection to each network, the communication using the specific communication device can be kept for the preset specific communication partner.

In this method, however, the routing information indicating the combination of the specific communication partner and the specific communication device must be previously set in the terminal, and the setting must be changed when the IP address of the communication partner or the IP address of the router included in the routing information is changed.

SUMMARY OF THE INVENTION

The present disclosure provides a data distribution device capable of being connected to a plurality of networks using a plurality of communication devices.

The data distribution device of the present disclosure includes a specific data distribution unit, a specific data distribution determining unit, and a routing setting unit. The specific data distribution unit is configured to distribute specific data from the first communication device connected to the first network. The specific data distribution determining unit is configured to determine whether or not the specific data distribution unit is distributing the specific data. The routing setting unit is configured to, based on the determination result by the specific data distribution determining unit, use the default route information acquired from the network to change the default route. The routing setting unit is also configured to hold the default route information without changing the default route when the specific data distribution determining unit determines that the specific data distribution unit is distributing the specific data and when the default route information has been acquired from the second communication device connected to the second network.

The imaging apparatus of the present disclosure includes the above-mentioned data distribution device and an imaging unit capable of performing video shooting, and is configured to set, as the specific data, video data output from the imaging unit.

The data distribution device and imaging apparatus of the present disclosure is useful for improving the stability when specific data is distributed.

DETAILED DESCRIPTION OF THE INVENTION

Hereinafter, the exemplary embodiments will be described in detail appropriately with reference to the accompanying drawings. Description more detailed than necessary is sometimes omitted. For example, a detailed description of a well-known item and a repeated description of substantially the same configuration are sometimes omitted. This is for the purpose of preventing the following descriptions from becoming more redundant than necessary and allowing persons skilled in the art to easily understand the exemplary embodiments.

The accompanying drawings and the following descriptions are provided to allow the persons skilled in the art to sufficiently understand the present disclosure. It is not intended that they restrict the main subject described within the scope of the claims.

First Exemplary Embodiment

The first exemplary embodiment is hereinafter described using FIG. 1 to FIG. 5.

In the present exemplary embodiment, video distribution device 100 is employed as one example of the data distribution device, and video data is employed as one example of the specific data. Furthermore, a configuration example where video distribution device 100 is included in imaging apparatus 10 and distributes the video data output from imaging unit 105 is described.

In the present disclosure, however, the specific data is not limited to video data, and the data distribution device is not limited to video distribution device 100. An apparatus including the data distribution device is not limited to imaging apparatus 10, either. For example, the configuration may be employed where the data distribution device is included in a game server and distributes game data as the specific data. Alternatively, the configuration may be employed where the data distribution device is included in a voice distribution device and distributes voice data as the specific data. Alternatively, the specific data may be billing data or the like.

In the following description, "video data" can be replaced with "specific data", "video distribution" can be replaced with "specific data distribution", and "video distribution device" can be replaced with "data distribution device"

[1-1. Configuration]

[1-1-1. Network Connection Configuration]

Figure 1:
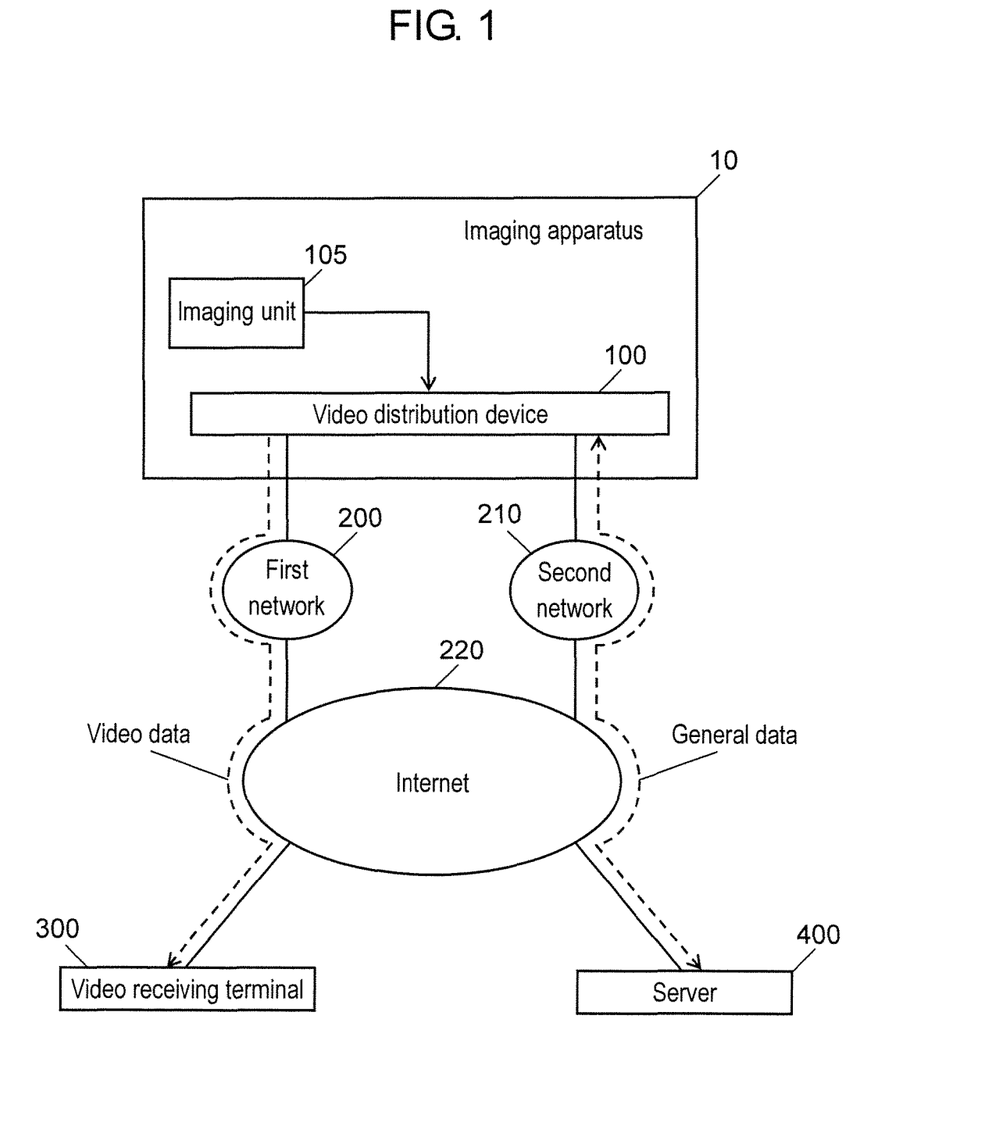
FIG. 1 is a diagram schematically showing one example of network connection of an imaging apparatus including a video distribution device in accordance with a first exemplary embodiment.

FIG. 1 is a diagram schematically showing one example of network connection of imaging apparatus 10 including video distribution device 100 in accordance with the first exemplary embodiment.

Imaging apparatus 10 includes imaging unit 105 capable of performing video shooting and video distribution device 100 as a data distribution device.

Imaging apparatus 10 is a professional-use digital video camera having a network connecting function, for example. However, imaging apparatus 10 is not limited to the professional-use digital video camera. For example, imaging apparatus 10 may be a still image photographing apparatus that has a network connecting function and can perform video shooting, a consumer-use digital video camera having a network connecting function, or a smartphone, mobile phone, tablet terminal, or personal computer capable of performing video shooting. Alternatively, imaging apparatus 10 may be a video signal processing apparatus or moving-picture reproducing apparatus (e.g. video player) that has a network connecting function and does not include imaging unit 105.

Imaging unit 105 is configured to shoot a moving image, convert it into digital video data, and output the video data. The function and configuration of imaging unit 105 are substantially the same as the function and configuration of a typically used digital video camera, so that the descriptions thereof are omitted.

Video distribution device 100 is configured to be capable of being connected to first network 200 connected to Internet 220 and second network 210 connected to Internet 220.

Video distribution device 100 is configured so that it can distribute, via first network 200, the video data output from imaging unit 105 to video receiving terminal 300 connected to Internet 220. This operation is hereinafter referred to also as "video distribution". Video distribution device 100 is also configured so that it can perform communication other than video distribution, such as the access to WWW (World Wide Web), file transfer to server 400, or transmission or reception of an electronic mail, and can transmit data via second network 210 in performing this communication during the video distribution.

In the present exemplary embodiment, the data transmitted via second network 210 during the video distribution is referred to as "general data", in order to distinguish from video data (specific data) distributed to video receiving terminal 300 via first network 200.

Video receiving terminal 300 is connected to Internet 220, and is communicably connected to video distribution device 100 via Internet 220 and first network 200. Video receiving terminal 300 is configured so that it can receive the video data distributed from video distribution device 100 and can reproduce or hold the video data.

The network may be configured so that video receiving terminal 300 can communicate with video distribution device 100 via Internet 220 and second network 210. In the present exemplary embodiment, however, video distribution device 100 is configured so that the video distribution to video receiving terminal 300 is performed via first network 200, but is not performed via second network 210 (described later).

Server 400 is connected to Internet 220, and is communicably connected to video distribution device 100 via Internet 220 and second network 210. Server 400 is used when video distribution device 100 performs communication other than video distribution, such as the access to WWW, file transfer to server 400, and transmission or reception of an electronic mail (namely, when it performs communication of general data). FIG. 1 shows one server 400, but the number of servers 400 may be two or more. These servers 400 may include a typical terminal or network device.

The network may be configured so that server 400 can communicate with video distribution device 100 via Internet 220 and first network 200. Video distribution device 100 of the present exemplary embodiment may communicate with server 400 via first network 200 when the video distribution is not being performed.

First network 200 and second network 210 are communication networks (networks) such as LTE, WiFi (Wireless Fidelity), LAN, and satellite communication. In the present exemplary embodiment, however, first network 200 and second network 210 are not limited to these networks. Each network may be any network as long as video distribution device 100 can be communicably connected to video receiving terminal 300 and server 400.

The video data, transmitted from video distribution device 100 to video receiving terminal 300 when video distribution device 100 distributes video data to video receiving terminal 300, is video data that is processed substantially in real time for streaming-distributing the moving image shot by imaging unit 105, for example. Thus, the specific data of the present exemplary embodiment may be stream data for distributing, in real time, the video data output from imaging unit 105. This real time includes delay time required for each processing and transmission.

The general data transmitted from video distribution device 100 to server 400 may include data in the video file that is created by storing the video data output from imaging unit 105 into a data storage unit (not shown).

Imaging apparatus 10 is configured so that it can be used as below, for example. In order to live broadcast moving images (e.g. news video) in shooting, imaging apparatus 10 streaming-distributes, to video receiving terminal 300, data (video data) of the moving images shot by imaging unit 105. Video receiving terminal 300 receives and reproduces the stream data distributed from imaging apparatus 10, and thus can display the moving images shot by imaging apparatus 10 substantially in real time. Imaging apparatus 10 also transmits, to server 400, the video file created by storing the data of the moving images shot by imaging unit 105. The moving images in the video file do not require real time processing, and hence can be made to have a larger data amount and higher image quality than the moving images to be streaming-distributed. The video file received by server 400 is edited or is used for edition, for example.

In order to respond to a request that users want to obtain the video file as early as possible, imaging apparatus 10 sometimes transmits the video file simultaneously with the streaming distribution.

However, the following problem can occur. When video distribution device 100 simultaneously transmits the stream data and the video file on one communication route, the amount of data to be transmitted becomes excessively larger than the communication capacity of the network, the transmission of the stream data halts temporarily, and video receiving terminal 300 cannot display the moving images in real time, for example. Here, examples of the simultaneous transmission include the following operations:

data of the video file is transmitted via first network 200 while video distribution is performed via first network 200; and video distribution is performed via second network 210 while the video file is transmitted via second network 210.

In order to prevent such a problem from occurring, video distribution device 100 is configured to perform the video distribution via first network 200 for video distribution, and transmit general data via second network 210 for general data communication during the video distribution.

In the conventional technology, even when the video distribution is performed along a default route passing through the network for video distribution, the following problem can occur:

when routing information including default route information is acquired from the network for general data communication, and the default route is updated to a route passing through the network for general data communication, the subsequent video distribution cannot be performed via the network for video distribution.

In order to prevent such a problem from occurring, video distribution device 100 of the present exemplary embodiment has the following configuration:

even when default route information is acquired from second network 210 for general data communication during video distribution, the video distribution via the network for video distribution can be continued by preventing the in-use default route from being changed in response to the default route information.

Hereinafter, the configuration and operation of video distribution device 100 are described.

"First network 200 for video distribution" is not limited to use for only video distribution. "Second network 210 for general data communication" does not mean that the transmission of general data is limited to this network. Video distribution device 100, during the video distribution, distributes video data via "first network 200 for video distribution" and transmits general data via "second network 210 for general data communication". When video distribution is not being performed, however, video distribution device 100 may transmit general data via "first network 200 for video distribution".

[1-1-2. Configuration of Video Distribution Device]

Next, the configuration of video distribution device 100 of the present exemplary embodiment is described.

Figure 2:
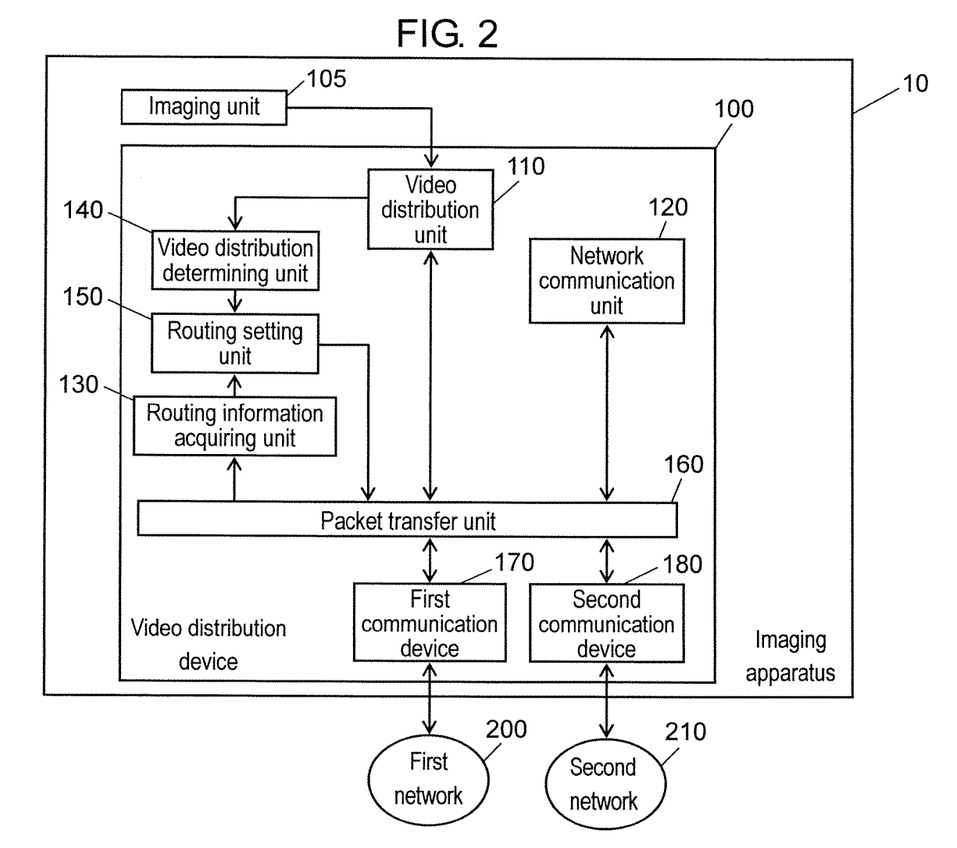
FIG. 2 is a block diagram schematically showing one configuration example of the video distribution device in accordance with the first exemplary embodiment.

In order to intelligibly show the operation described in the present exemplary embodiment, the block diagram of FIG. 2 shows main blocks related to the present exemplary embodiment and omits the functions and blocks related to the other operations. For example, similarly to a typically used digital video camera, imaging apparatus 10 includes the following elements:

a power supply;

a display unit (display or finder);

a command receiving unit (user interface) for receiving a command from a user and sending it to a controller;

the controller for controlling each block of imaging apparatus 10 on the basis of the command or the like from the user;

a data storage unit for storing video data output from imaging unit 105 into a recording medium (e.g. memory card or hard disk drive); and a recording medium mounting unit on which the recording medium such as a memory card is detachably mounted.

However, these blocks perform substantially the same operations as those of the similar blocks used in the typical digital video camera. Therefore, in order to prevent the description from becoming more redundant than necessary, the description and drawing thereof are omitted.

Each block of FIG. 2 may be formed of an independent circuit, or may be configured to, with a processor, execute a program created so as to achieve the operations of one or more of the blocks of FIG. 2.

FIG. 2 is a block diagram schematically showing one configuration example of video distribution device 100 in accordance with the first exemplary embodiment.

Video distribution device 100 includes video distribution unit 110 as a specific data distribution unit, network communication unit 120, routing information acquiring unit 130, video distribution determining unit 140 as a specific data distribution determining unit, routing setting unit 150, packet transfer unit 160, first communication device 170, and second communication device 180.

Video distribution unit 110 is configured to perform IP (Internet Protocol) communication with video receiving terminal 300 via first communication device 170 and first network 200, and to convert the video data output from imaging unit 105 into an IP packet and distribute (video distribution) it to video receiving terminal 300. Here, the video data handled by video distribution unit 110 is not limited to the video data output from imaging unit 105. For example, the video data may be video data that is stored in the recording medium included in imaging apparatus 10 (or, detachably mounted on imaging apparatus 10), or may be video data (or video signal) that is input from another imaging apparatus or a moving-picture reproducing apparatus.

Network communication unit 120 is configured to, when imaging apparatus 10 performs IP communication other than video distribution, perform the IP communication with server 400 via second communication device 180 and second network 210. The IP communication is, for example, the access to WWW, file transfer to server 400, or transmission or reception of an electronic mail. Hereinafter, "IP communication" is simply referred to as "communication". When video distribution unit 110 is not distributing video data, network communication unit 120 performs communication along the default route at this time. For example, network communication unit 120 sometimes communicates with server 400 via first communication device 170 and first network 200.

Routing information acquiring unit 130 is configured to connect video distribution device 100 to a network using a communication protocol such as the DHCP or PPP. Routing information acquiring unit 130 is configured to acquire routing information including default route information via a network connected to video distribution device 100 from a server connected to the network, and inform routing setting unit 150 of the acquired default route information. Here, the network is first network 200 or second network 210, and the server is a DHCP server or PPP server, for example.

Video distribution determining unit 140 is configured to determine "whether or not video distribution device 100 is distributing video data" and output the determination result to routing setting unit 150.

Routing setting unit 150 is configured to hold the default route information acquired from routing information acquiring unit 130, and inform packet transfer unit 160 of the default route information on the basis of the video distribution state acquired from video distribution determining unit 140. Routing setting unit 150 includes a holding unit (not shown) for holding the default route information acquired from routing information acquiring unit 130. The details of these operations of routing setting unit 150 are described later.

Packet transferring unit 160 is configured to transfer the IP packet, which is to be transmitted from video distribution device 100, to first communication device 170 or second communication device 180 in accordance with the content of the IP packet. Packet transferring unit 160 is also configured to change (update) the default route on the basis of the default route information informed from routing setting unit 150. Hereinafter, this operation is referred to also as "acquiring the default route from routing setting unit 150", for convenience sake. When the transfer destination of the IP packet is not known, packet transfer unit 160 determines the transfer destination of the IP packet on the basis of the default route acquired from routing setting unit 150. Packet transferring unit 160 transfers the IP packet that is acquired from first network 200 by first communication device 170 or the IP packet that is acquired from second network 210 by second communication device 180 to one of video distribution unit 110, network communication unit 120, and routing information acquiring unit 130 in accordance with the content of the IP packet.

The default route is routing information used when the transmission source cannot determine the transfer destination of the IP packet to be transmitted. Therefore, generally, the number of default routes used by one device is one. When video distribution unit 110 is distributing video data, however, packet transfer unit 160 operates so as to transfer the IP packet of the general data not by reference to the default route set in packet transfer unit 160, but by reference to the default route information held in routing setting unit 150 (as described later). The details of the operation are described later.

First communication device 170 and second communication device 180 are configured to connect video distribution device 100 to a network and transmit or receive the IP packet via the network. First communication device 170 and second communication device 180 may be in conformity with any standard, for example, LTE, Ethernet (registered trademark), or WiFi. In the present exemplary embodiment, first communication device 170 is set as a communication device for video distribution, and second communication device 180 is set as a communication device for general data communication. However, the present exemplary embodiment is not limited to this configuration. "First" and "second" may be set reversely.

It is preferable that video distribution device 100 includes both of first communication device 170 and second communication device 180. However, the present exemplary embodiment is not limited to this configuration. For example, video distribution device 100 is configured to satisfy the following condition, for example:

video distribution device 100 includes a USB interface;
an LTE-compliant communication device, Ethernet (registered trademark)-compliant communication device, or WiFi-compliant communication device, which is configured to be connected the USB interface, is connected to the USB interface of video distribution device 100;
the communication device is used as both or one of first communication device 170 and second communication device 180.

The number of communication devices included in video distribution device 100 is not limited to two, but may be three or more.

In the present exemplary embodiment, first communication device 170 is set as the communication device for video distribution, and second communication device 180 is set as the communication device for general data communication. As discussed above, first communication device 170 is not limited to use for only video distribution, the general data does not necessarily pass through only second communication device 180. When video data is not being distributed, first communication device 170 can pass the general data.

[1-2. Operation]

Next, the default route setting operation and IP packet transmitting operation in video distribution device 100 having the above-mentioned configuration are described.

Figure 3:
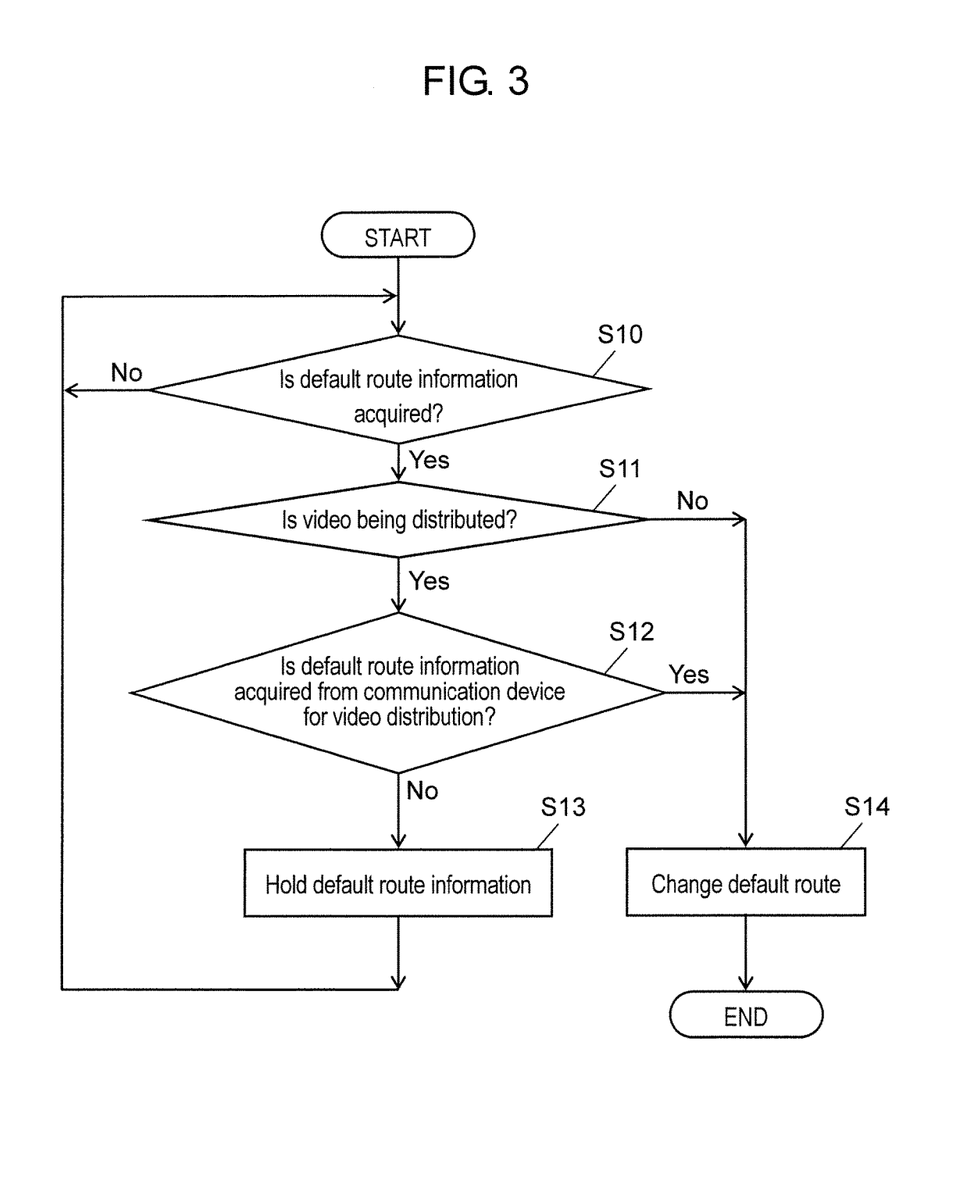
FIG. 3 is a flowchart schematically showing one example of a default route setting operation when the video distribution device acquires default route information in accordance with the first exemplary embodiment.

First, the default route setting operation when video distribution device 100 acquires default route information is described using FIG. 3. Next, the default route setting operation when video distribution device 100 stops the video distribution is described using FIG. 4. Next, the IP packet transmitting operation in video distribution device 100 is described using FIG. 5.

[1-2-1. Default Route Setting Operation when Default Route Information is Acquired]

FIG. 3 is a flowchart schematically showing one example of a default route setting operation when video distribution device 100 acquires default route information in accordance with the first exemplary embodiment.

When video distribution device 100 is connected to first network 200 or second network 210, routing information acquiring unit 130 acquires default route information from the network using a communication protocol such as the DHCP or PPP (step S10).

When default route information is not acquired in step S10 (No), routing information acquiring unit 130 performs the processing of step S10 again.

Also after video distribution device 100 is connected to the network, routing information acquiring unit 130 regularly acquires the default route information from the network using the DHCP or PPP.

The acquirement method of the default route information by routing information acquiring unit 130 is not limited to the DHCP or PPP, but may be based on another method.

When the default route information is acquired in step S10 (Yes), routing information acquiring unit 130 informs routing setting unit 150 of the acquired default route information and the communication device used for the acquirement of the default route information. In the present exemplary embodiment, routing information acquiring unit 130 informs routing setting unit 150 of which of first communication device 170 and second communication device 180 has been used.

Upon receiving the default route information from routing information acquiring unit 130, routing setting unit 150 recognizes "whether or not video distribution device 100 is distributing video data" (step S11). This recognition can be performed based on the output from video distribution determining unit 140 (namely, determination result of whether or not video distribution device 100 is distributing video data).

In the present exemplary embodiment, video distribution determining unit 140 is configured to, when it detects that video distribution device 100 is in one of the following states, output the determination result of "video distribution device 100 is distributing video data".

(1) Video distribution device 100 has accepted a user operation of starting the video distribution, but has not accepted a user operation of stopping the video distribution. These user operations are performed via a command receiving unit (not shown) that receives a command from the user and sends it to a controller (not shown).

(2) Video distribution device 100 has received a start request of the video distribution that is transmitted from video receiving terminal 300, but has not received a stop request of the video distribution.

Therefore, when video distribution determining unit 140 detects that video distribution device 100 is in none of the above-mentioned states, it outputs the determination result of "video distribution device 100 is not distributing video data".

Video distribution determining unit 140 of the present exemplary embodiment is not limited to these configurations. However, video distribution determining unit 140 may be configured to determine whether or not video distribution device 100 is distributing video data on the basis of a determination reference other than the above-mentioned ones. For example, video distribution determining unit 140 may be configured to recognize the operation state of video distribution unit 110 and determine whether or not video distribution device 100 is distributing video data.

When it is recognized in step S11 (No) that video distribution device 100 is not distributing video data, routing setting unit 150 informs packet transfer unit 160 of the default route information acquired in step S10. Based on the default route information, the default route (namely, default route set in packet transfer unit 160) in video distribution device 100 is changed (step S14).

When video distribution device 100 is not distributing video data, the default route information informed to packet transfer unit 160 in step S14 may have been acquired from either of first communication device 170 and second communication device 180. In other words, when video distribution device 100 is not distributing video data, the default route may pass through either of first network 200 and second network 210.

When it is recognized in step S11 (Yes) that video distribution device 100 is distributing video data, routing setting unit 150 recognizes whether or not the acquired default route information in step S10 has been acquired from the communication device for video distribution (in the present exemplary embodiment, first communication device 170) (step S12).

When it is recognized in step S12 (Yes) that the acquired default route information in step S10 has been acquired from first communication device 170 for video distribution, routing setting unit 150 informs packet transfer unit 160 of the default route information acquired in step S10. Based on the default route information, the default route (namely, default route set in packet transfer unit 160) in video distribution device 100 is changed (step S14).

The processing in step S14 sometimes corresponds to updating of the default route already set in packet transfer unit 160. For example, in a route passing through a certain network (e.g. first network 200), one route is blocked by a device failure or the like and the route is sometimes changed to another route by a manager. Alternatively, video distribution device 100 radio-connected to a certain access point for radio communication is sometimes radio-connected to another access point by movement or the like. When the default route set in packet transfer unit 160 is not updated after such route change, there is a possibility that the video distribution is performed along the default route, which passes through the blocked route or the access point before the movement, and hence data does not arrive at video receiving terminal 300. However, the default route is updated by the processing in step S14, so that such a trouble can be avoided and the video distribution can be continued.

When it is recognized in step S12 (No) that the acquired default route information in step S10 has been acquired from second communication device 180 for general data communication, routing setting unit 150 keeps the default route information acquired in step S10 without change, and does not inform packet transfer unit 160. Therefore, the default route of packet transfer unit 160 is not changed (step S13). When the default route information acquired from second communication device 180 is set in packet transfer unit 160 during the video distribution, there is a possibility that, after the setting, video distribution device 100 cannot distribute video data from first communication device 170 to video receiving terminal 300. Since the default route set in packet transfer unit 160 is not changed, video distribution device 100 can continue the video distribution to video receiving terminal 300 that is performed from first communication device 170 via first network 200.

After the processing in step S13, the process returns to step S10.

Each of above-mentioned step S10 to step S14 may be repeated. The sequence of the steps may be changed in a range in which contradiction in the operations does not arise.

[1-2-2. Default Route Setting Operation when Video Distribution is Stopped]

Figure 4:
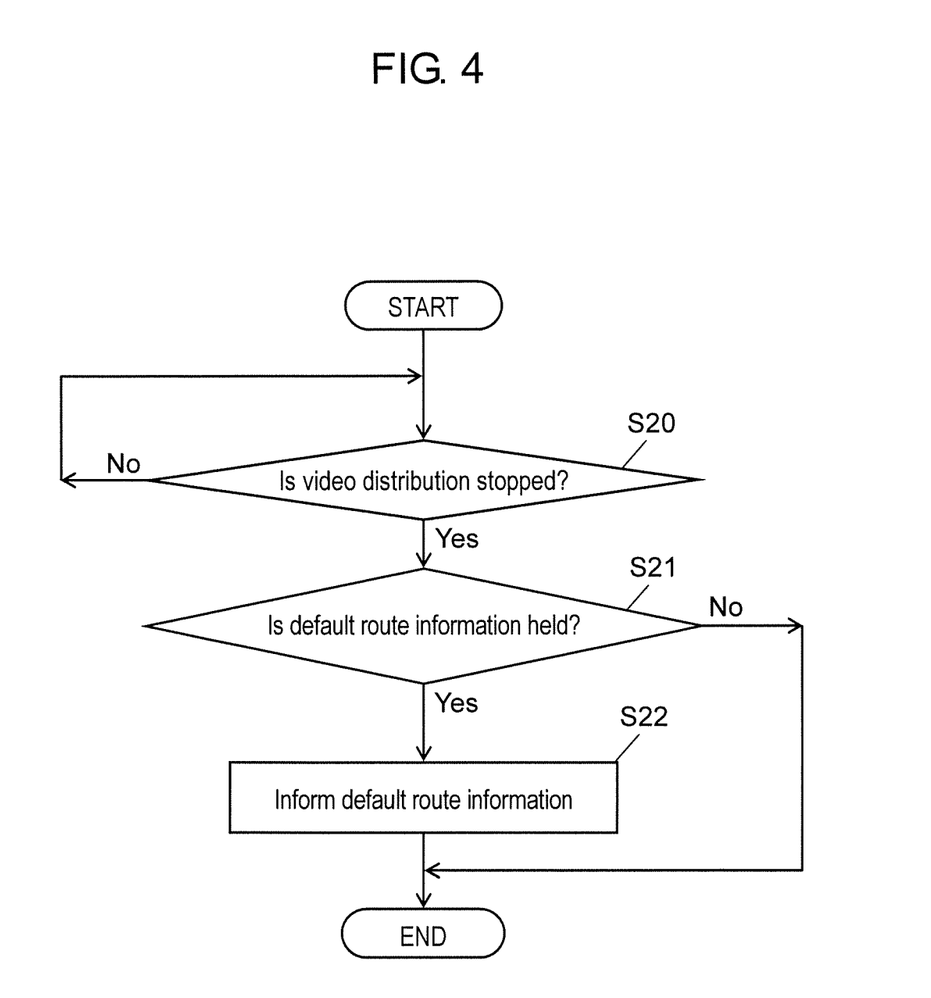
FIG. 4 is a flowchart schematically showing one example of a default route setting operation when the video distribution device stops video distribution in accordance with the first exemplary embodiment.

The default route setting operation when video distribution device 100 stops video distribution in is described using FIG. 4.

FIG. 4 is a flowchart schematically showing one example of the default route setting operation when video distribution device 100 stops video distribution in accordance with the first exemplary embodiment.

Routing setting unit 150, based on the output from video distribution determining unit 140, recognizes whether or not video distribution device 100 has stopped the video distribution (step S20).

In the present exemplary embodiment, video distribution determining unit 140 is configured to, when it detects that video distribution device 100 is in one of the following states, output the determination result of "video distribution device 100 has stopped video distribution".
(1) The user has performed an operation of making video distribution device 100 stop video distribution. This user operation is performed via a command receiving unit (not shown) that receives a command from the user and sends it to a controller (not shown).
(2) Video distribution device 100 has received a stop request of the video distribution from video receiving terminal 300.
(3) First communication device 170 for video distribution has been separated from first network 200 for video distribution.

Video distribution determining unit 140 of the present exemplary embodiment is not limited to these configurations. However, video distribution determining unit 140 may be configured to determine whether or not video distribution device 100 has stopped the video distribution on the basis of a determination reference other than the above-mentioned ones. For example, video distribution determining unit 140 may be configured to recognize the operation state of video distribution unit 110 and determine whether or not video distribution device 100 has stopped the video distribution.

When it is recognized in step S20 (No) that video distribution device 100 has not stopped the video distribution, the processing of step S20 is performed again.

When it is recognized in step S20 (Yes) that video distribution device 100 has stopped the video distribution, routing setting unit 150 recognizes whether or not the default route information is held (step S21).

When it is recognized in step S21 (No) that the default route information is not held, the processing is completed.

When it is recognized in step S21 (Yes) that the default route information is held, routing setting unit 150 informs packet transfer unit 160 of the held default route information. Thus, based on the default route information, the default route (namely, default route set in packet transfer unit 160) of video distribution device 100 is changed (step S22).

Each of above-mentioned step S20 to step S22 may be repeated. The sequence of the steps may be changed in a range in which contradiction in the operations does not arise.

[1-2-3. IP Packet Transmitting Operation]

Figure 5:
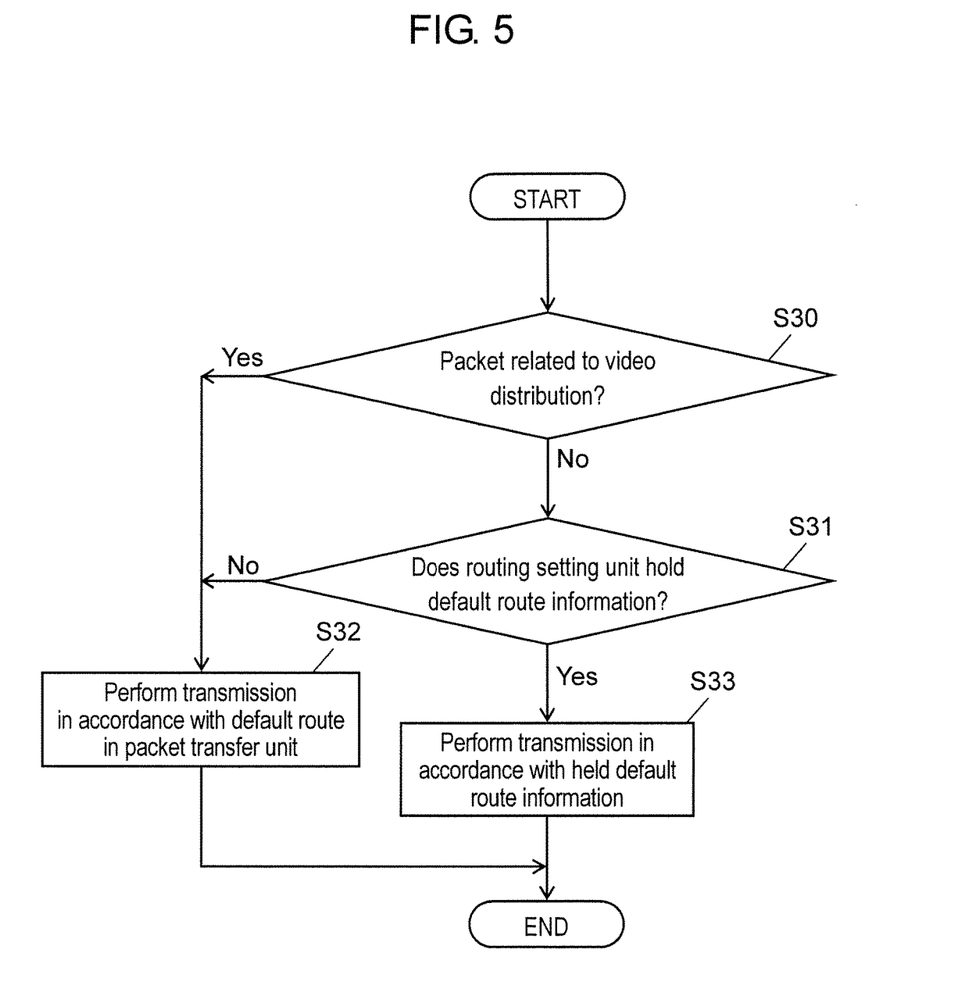
FIG. 5 is a flowchart schematically showing one example of the IP packet transmitting operation of the video distribution device in accordance with the first exemplary embodiment.

Next, the IP packet transmitting operation of video distribution device 100 is described using FIG. 5.

FIG. 5 is a flowchart schematically showing one example of the IP packet transmitting operation of video distribution device 100 in accordance with the first exemplary embodiment.

Packet transfer unit 160 determines whether or not the IP packet to be transmitted is an IP packet related to video distribution (step S30).

Packet transfer unit 160 is configured to perform this determination by recognizing whether or not the communication protocol and port number for video distribution are applied to the IP packet. However, the present exemplary embodiment is not limited to this configuration. This determination may be performed on the basis of another reference. For example, packet transfer unit 160 may be configured to include a receiving interface dedicated to video distribution and to determine that only the IP packet acquired via the receiving interface is an IP packet related to the video distribution.

When it is determined in step S30 (Yes) that the IP packet to be transmitted is an IP packet related to the video distribution, packet transfer unit 160 transmits the IP packet along the default route set in packet transfer unit 160—from first communication device 170 for video distribution to video receiving terminal 300 via first network 200 for video distribution—(step S32).

When it is determined in step S30 (No) that the IP packet to be transmitted is an IP packet (namely, of general data) that is not related to the video distribution, packet transfer unit 160 recognizes whether routing setting unit 150 holds the default route information (step S31).

When it is recognized in step S31 (Yes) that routing setting unit 150 holds the default route information, packet transfer unit 160 refers to the default route information held by routing setting unit 150 and transmits the IP packet in accordance with the default route information (step S33).

When it is recognized in step S31 (No) that routing setting unit 150 does not hold a default route, packet transfer unit 160 transmits the IP packet along the default route of packet transfer unit 160, similarly to the transmission of the IP packet related to video distribution (step S32).

Each of above-mentioned step S30 to step S33 may be repeated. The sequence of the steps may be changed in a range in which contradiction in the operations does not arise.

[1-3. Advantageous Effect or the Like]

Thus, in the present exemplary embodiment, video distribution device 100 taken as an example of a data distribution device includes video distribution unit 110 taken as an example of a specific data distribution unit, video distribution determining unit 140 taken as an example of a specific data distribution determining unit, and routing setting unit 150. The specific data distribution unit (video distribution unit 110) is configured to distribute the video data taken as an example of the specific data from first communication device 170 that is connected to first network 200. The specific data distribution determining unit (video distribution determining unit 140) is configured to determine whether or not the specific data distribution unit (video distribution unit 110) is distributing the specific data (video data). Routing setting unit 150 is configured to satisfy the following conditions:

based on the determination result of the specific data distribution determining unit (video distribution determining unit 140), the default route information acquired from the network is used for changing the default route; and when the specific data distribution determining unit (video distribution determining unit 140) determines that the specific data distribution unit (video distribution unit 110) is distributing the specific data (video data), and the default route information has been acquired from second communication device 180 connected to second network 210, the default route information is held without changing the default route.

Routing setting unit 150 is also configured to, when the specific data distribution determining unit (video distribution determining unit 140) determines that the specific data distribution unit (video distribution unit 110) is distributing the specific data (video data), change the default route on the basis of the default route information acquired from first communication device 170.

The data distribution device (video distribution device 100) is configured to, when the specific data distribution determining unit (video distribution determining unit 140) determines that the specific data distribution unit (video distribution unit 110) is distributing the specific data (video data), transmit general data other than the specific data in accordance with the default route information held in routing setting unit 150.

Routing setting unit 150 is also configured to, when the specific data distribution determining unit (video distribution determining unit 140) recognizes that the distribution of the specific data (video data) has been stopped, change the default route on the basis of the default route information held in routing setting unit 150.

The data distribution device (video distribution device 100) may be configured to be mountable on imaging apparatus 10 including imaging unit 105 capable of performing video shooting, and may be also configured to set the video data output from imaging unit 105 to be specific data.

The specific data may be stream data for distributing, in real time, the video data output from imaging unit 105, and general data other than the specific data may include the data of the video file that is created by storing the video data output from imaging unit 105.

Thus, in video distribution device 100, when default route information is acquired via first communication device 170 for video distribution during the video distribution, the default route is changed based on the default route information. When default route information is acquired via second communication device 180 for general data communication during the video distribution, the default route information is held in routing setting unit 150, but the default route is not changed.

Therefore, during the video distribution, video distribution device 100 keeps, without change, the default route set to pass through first network 200 for video distribution even when the default route information is acquired from second network 210 for general data communication. Thus, video distribution device 100 can continue the video distribution along the default route passing through first network 200.

In other words, video distribution device 100 can stably continue the video distribution by preventing the occurrence of the following problem:

although video distribution (for example, video distribution by streaming) via a network for video distribution is intended to be kept, the default route is changed so as to pass through another network and a trouble occurs in the video distribution.

Even when a network configuration is employed where communication from second network 210 for general data communication to video receiving terminal 300 is not allowed, video distribution device 100 can stably continue the video distribution to video receiving terminal 300. That is because video distribution device 100 does not perform the video distribution along the default route passing through second network 210.

Video distribution device 100, during video distribution, performs the transmission of general data by reference to the default route information passing through second network 210. Here, the default route information has been acquired from second network 210 for general data communication, and is held in routing setting unit 150. Thus, video distribution device 100 can prevent the occurrence of the following problem during video distribution, for example:

video distribution (for example, transmission of stream data) and transmission of general data are simultaneously performed along one communication route, and hence the amount of data to be transmitted becomes excessively larger than the communication capacity of the network to temporarily halt the video distribution.

Video distribution device 100 can perform these operations using a protocol such as the DHCP or PPP. Therefore, the operation of previously setting the routing information that indicates the combination of the specific communication partner and the specific communication device is not required, though this operation has been required in the conventional technology. Therefore, video distribution device 100 does not require the following operation, either:

when the IP address of the communication partner or the IP address of the router included in the routing information is changed, the user changes the setting by himself/herself.

After the stop of the video distribution, video distribution device 100 informs packet transfer unit 160 of the default route information held in routing setting unit 150, changes the default route, and transmits the general data along the default route. Therefore, video distribution device 100 can transmit the general data also after the stop of the video distribution, similarly during the video distribution.

Other Exemplary Embodiments

Thus, the first exemplary embodiment has been described as an example of a technology disclosed in the present application. However, the disclosed technology is not limited to the exemplary embodiment. The disclosed technology can be also applied to the exemplary embodiment having undergone change, replacement, addition, or omission. A new exemplary embodiment may be created by combining the components described in the first exemplary embodiment.

Another exemplary embodiment is described hereinafter.

FIG. 1 shows the configuration example where each of video receiving terminal 300 and server 400 is connected to one network. However, the network system may be configured to prevent connection from second network 210 to video receiving terminal 300. The network system may be configured to prevent connection from first network 200 to server 400.

It may be allowed that routing setting unit 150 informs packet transfer unit 160 of the held default route information when routing setting unit 150 recognizes the stop of the video distribution, and hence comes into the state where the default route information is not held. When video distribution device 100 is not distributing video data, the default route information acquired from the network does not need to be held in routing setting unit 150. Therefore, the operation in step S32 may be a packet transfer operation performed when video distribution device 100 is not distributing video data.

The present disclosure is applicable to a data distribution device and imaging apparatus capable of being connected to a plurality of networks using a plurality of communication devices. Specifically, the present disclosure is applicable to a moving image pickup apparatus such as a professional-use video camera or consumer-use video camera, a still image pickup apparatus such as a digital still camera capable of shooting a moving image, a smartphone, a tablet terminal, a moving-picture reproducing apparatus, a voice distribution apparatus, or a server.

What is claimed is:

1. An electronic device, comprising:
   a processor configured to:
   enable a plurality of routing rules to contribute a rule to a set of default route;
   receive transmission packets to be routed to a first destination address;
   obtain application data packets associated with the transmission packets;
   make a routing decision for the transmission packets based at least in part on the rule or the application data packets;
   make a routing decision for the application data packets; and
   transmit the transmission packets, by using the routing decision, to the first destination address,
   wherein to make the routing decision for the transmission packets, the processor is configured to select a first interface through which the transmission packets are transmitted,
   wherein to make the routing decision for the application data packets, the processor is configured to:
   track default routing information;
   select a second interface for the application data packets based on the default routing information; and
   transmit the application data packet to a second destination address through the second interface, while transmission of the transmission packets to the first destination address is maintained through the first interface.

2. The electronic device of claim 1, wherein the processor is further configured to:
   determine whether the default information corresponds to the first interface;
   when it is determined that the default information corresponds to the first interface, select the second interface.

3. The electronic device of claim 1, wherein the processor is configured to update a default rout indicated by the default routing information when the default routing information is transmitted through the first interface.

4. A method for selecting an interface for packet routing, comprising:
   enabling a plurality of routing rules to contribute a rule to a set of default route;
   receiving transmission packets to be routed to a first destination address;
   obtaining application data packets associated with the transmission packets;
   making a routing decision for the transmission packets based at least in part on the rule or the application data packets;
   making a routing decision for the application data packets; and
   transmitting the transmission packets, by using the routing decision, to the destination address, wherein:
   the making the routing decision for the transmission packets includes selecting a first interface through which the transmission packets are transmitted, and
   the making the routing decision for the application data packets includes:
   tracking default routing information;
   selecting a second interface for the application data packets based on the default routing information; and
   transmitting the application data packet to a second address through the second interface, while the transmission of the transmission packets to the first destination address is maintained through the first interface.

5. The method of claim 4, further comprising:
   determining whether the default information corresponds to the first interface; and
   after it is determined that the default information corresponds to the first interface, selecting the second interface.

6. The method of claim 4, further comprising:
   updating a default rout indicated by the default routing information after the default routing information is transmitted through the first interface.

* * * * *